(12) United States Patent
Suh

(10) Patent No.: US 10,560,843 B2
(45) Date of Patent: Feb. 11, 2020

(54) METHOD AND SYSTEM FOR SUPPORTING SECURITY AND INFORMATION FOR PROXIMITY BASED SERVICE IN MOBILE COMMUNICATION SYSTEM ENVIRONMENT

(71) Applicant: Samsung Electronics Co., Ltd., Suwon-si, Gyeonggi-do (KR)

(72) Inventor: Kyungjoo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 15/025,800

(22) PCT Filed: Oct. 13, 2014

(86) PCT No.: PCT/KR2014/009593
§ 371 (c)(1),
(2) Date: Mar. 29, 2016

(87) PCT Pub. No.: WO2015/053602
PCT Pub. Date: Apr. 16, 2015

(65) Prior Publication Data
US 2016/0219437 A1    Jul. 28, 2016

(30) Foreign Application Priority Data

Oct. 11, 2013 (KR) .................. 10-2013-0121428
Nov. 4, 2013 (KR) .................. 10-2013-0133179
May 2, 2014 (KR) .................. 10-2014-0053645

(51) Int. Cl.
*H04L 29/06*    (2006.01)
*H04W 12/06*    (2009.01)
(Continued)

(52) U.S. Cl.
CPC ............. *H04W 12/06* (2013.01); *H04W 4/70* (2018.02); *H04W 12/04* (2013.01); *H04L 63/20* (2013.01);
(Continued)

(58) Field of Classification Search
CPC ........................... H04L 2209/80; H04L 63/20
See application file for complete search history.

(56) References Cited

U.S. PATENT DOCUMENTS 9,240,881 B2 *  1/2016  Broustis .................. H04L 9/08
2007/0141984 A1  6/2007  Kuehnel et al.
(Continued)

FOREIGN PATENT DOCUMENTS

KR    10-2008-0085843 A    9/2008
WO    2013/089452 A1    6/2013
(Continued)

*Primary Examiner* — Jason K Gee
(74) *Attorney, Agent, or Firm* — Jefferson IP Law, LLP

(57) ABSTRACT

A method for acquiring security related information for Proximity based security (Prose) search and prose communication by User Equipment (UE) in a mobile communication network is provided. A security communication method for UE for prose includes transmitting an attach request to an evolved Node B (eNB), receiving an attach response that includes security related information for the prose from the eNB, and performing device-to-device communication using the security related information.

10 Claims, 17 Drawing Sheets

(51) Int. Cl.
  *H04W 12/04* (2009.01)
  *H04W 4/70* (2018.01)
  H04W 12/10 (2009.01)
  H04W 76/14 (2018.01)
  H04W 60/04 (2009.01)
  H04W 8/20 (2009.01)
(52) U.S. Cl.
  CPC .............. *H04W 8/20* (2013.01); *H04W 12/10* (2013.01); *H04W 60/04* (2013.01); *H04W 76/14* (2018.02)

(56) References Cited

U.S. PATENT DOCUMENTS

2011/0261961 A1* 10/2011 Dharmaraju .......... H04W 12/04
  380/277
2012/0233635 A1* 9/2012 Hakola ................. H04W 12/02
  725/25
2013/0188546 A1 7/2013 Turtinen et al.
2014/0301552 A1* 10/2014 Yi ............................ H04L 9/30
  380/270
2014/0335791 A1* 11/2014 Kim ...................... H04W 4/023
  455/41.2

FOREIGN PATENT DOCUMENTS

WO 2013/095001 A1 6/2013
WO 2013/122374 A1 8/2013

* cited by examiner

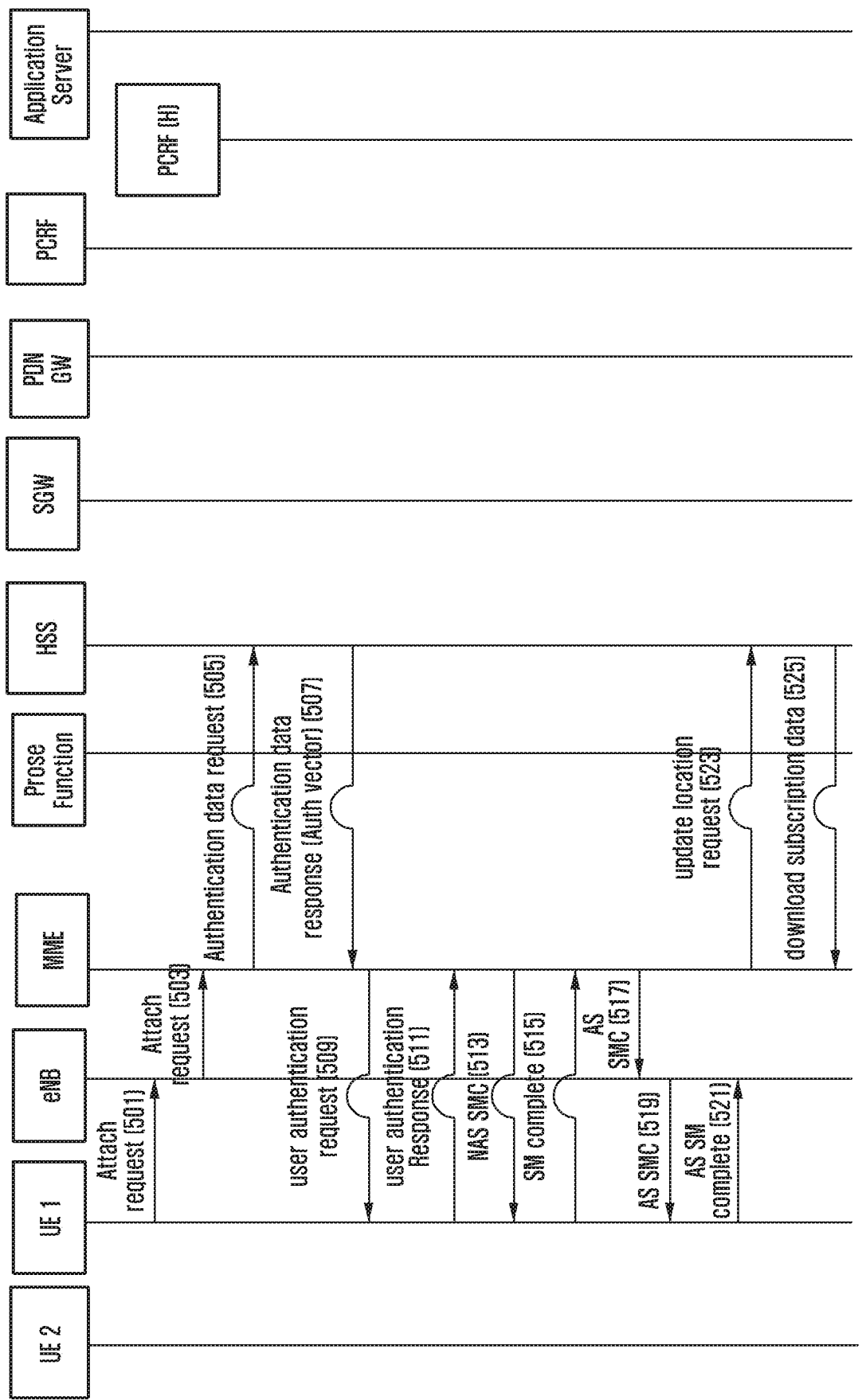

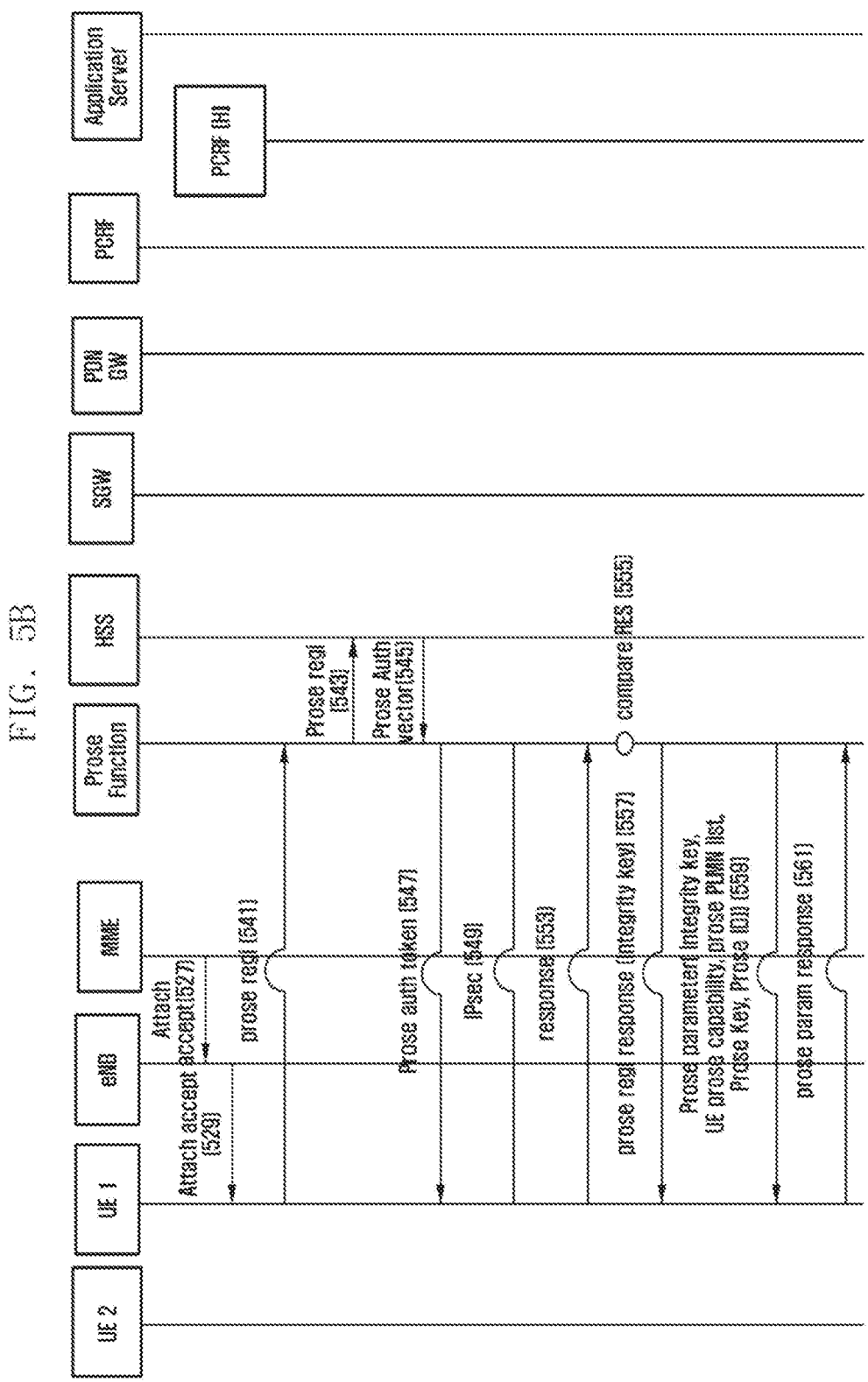

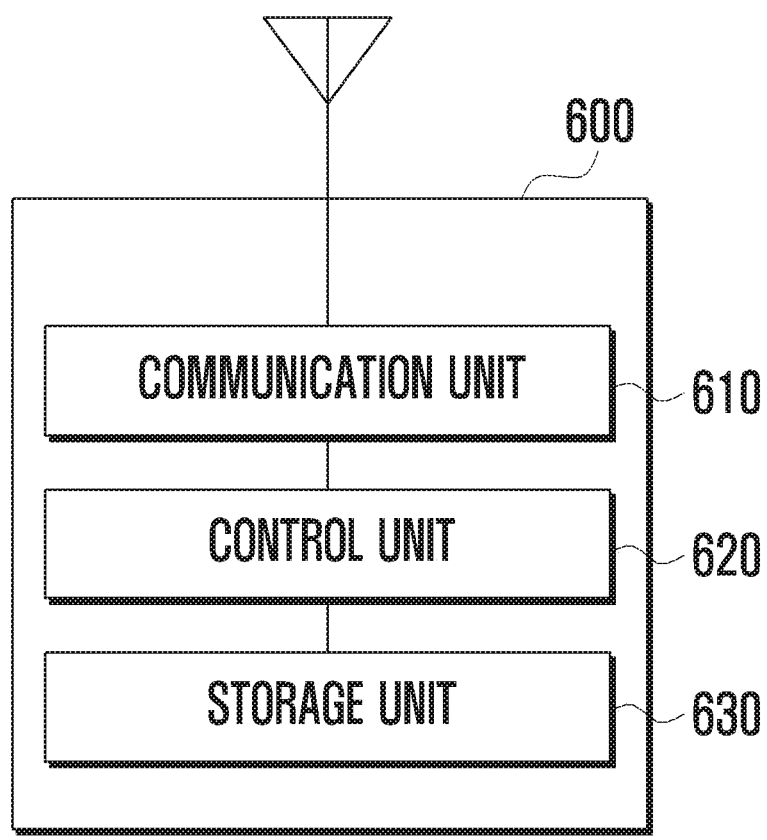

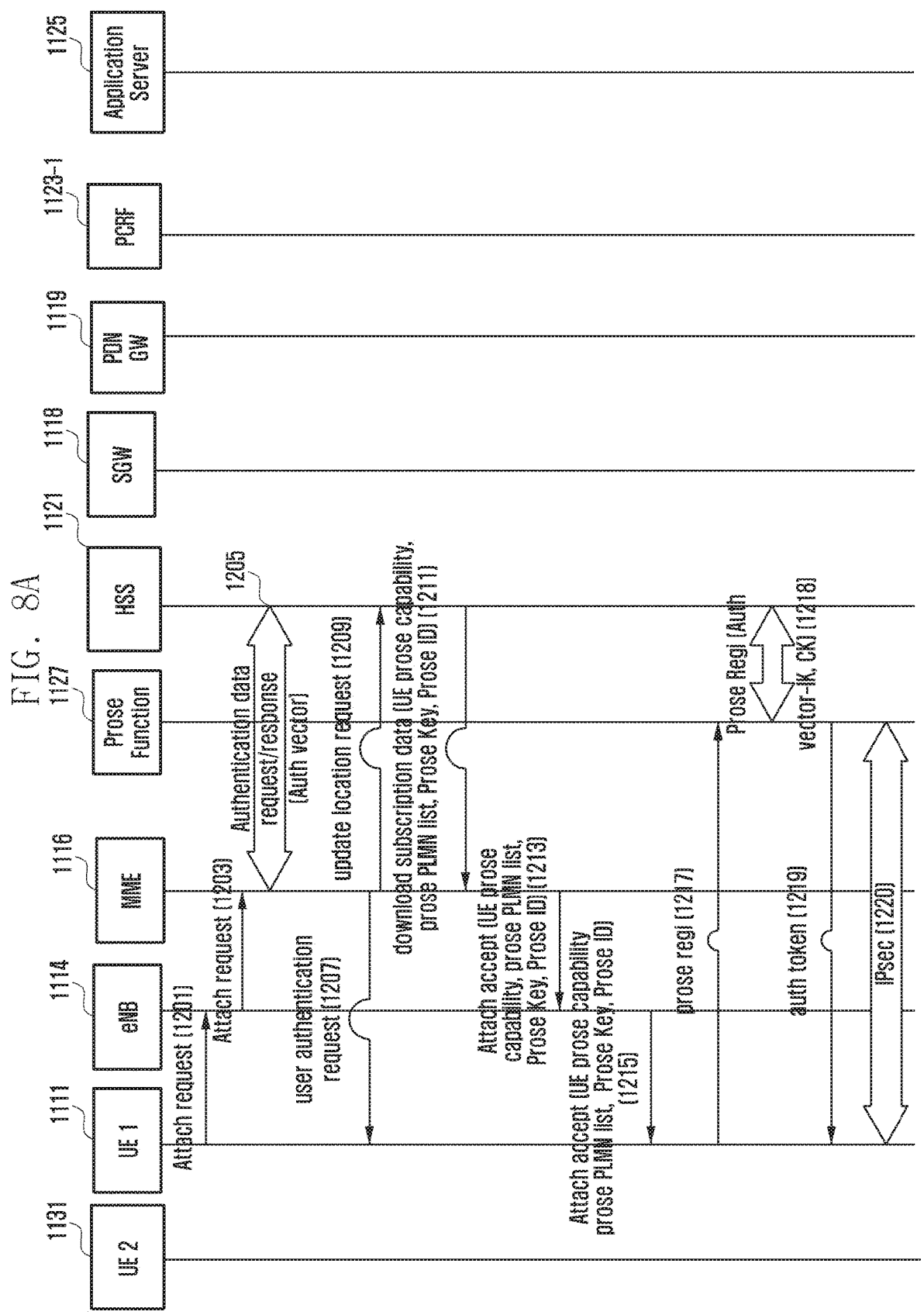

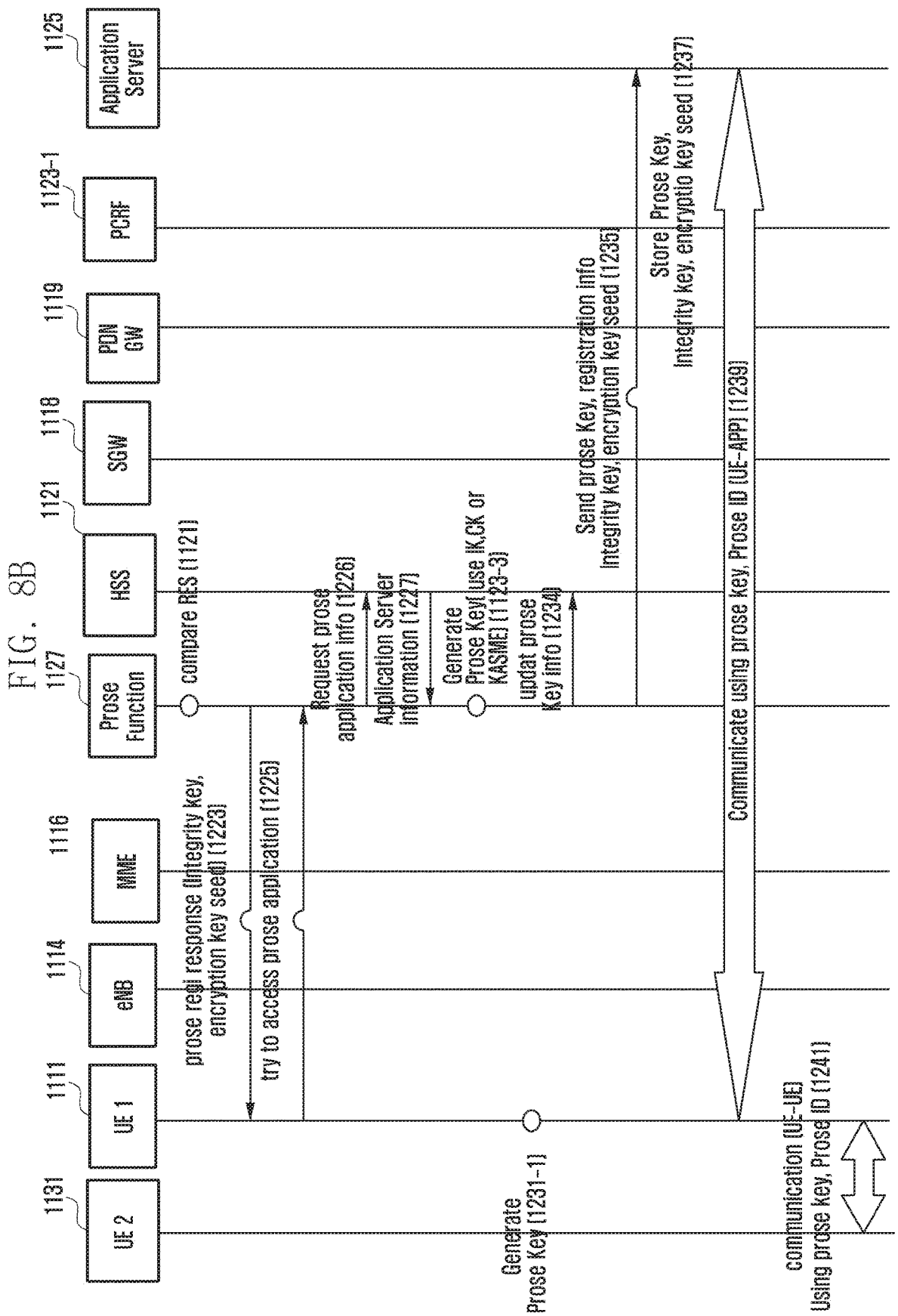

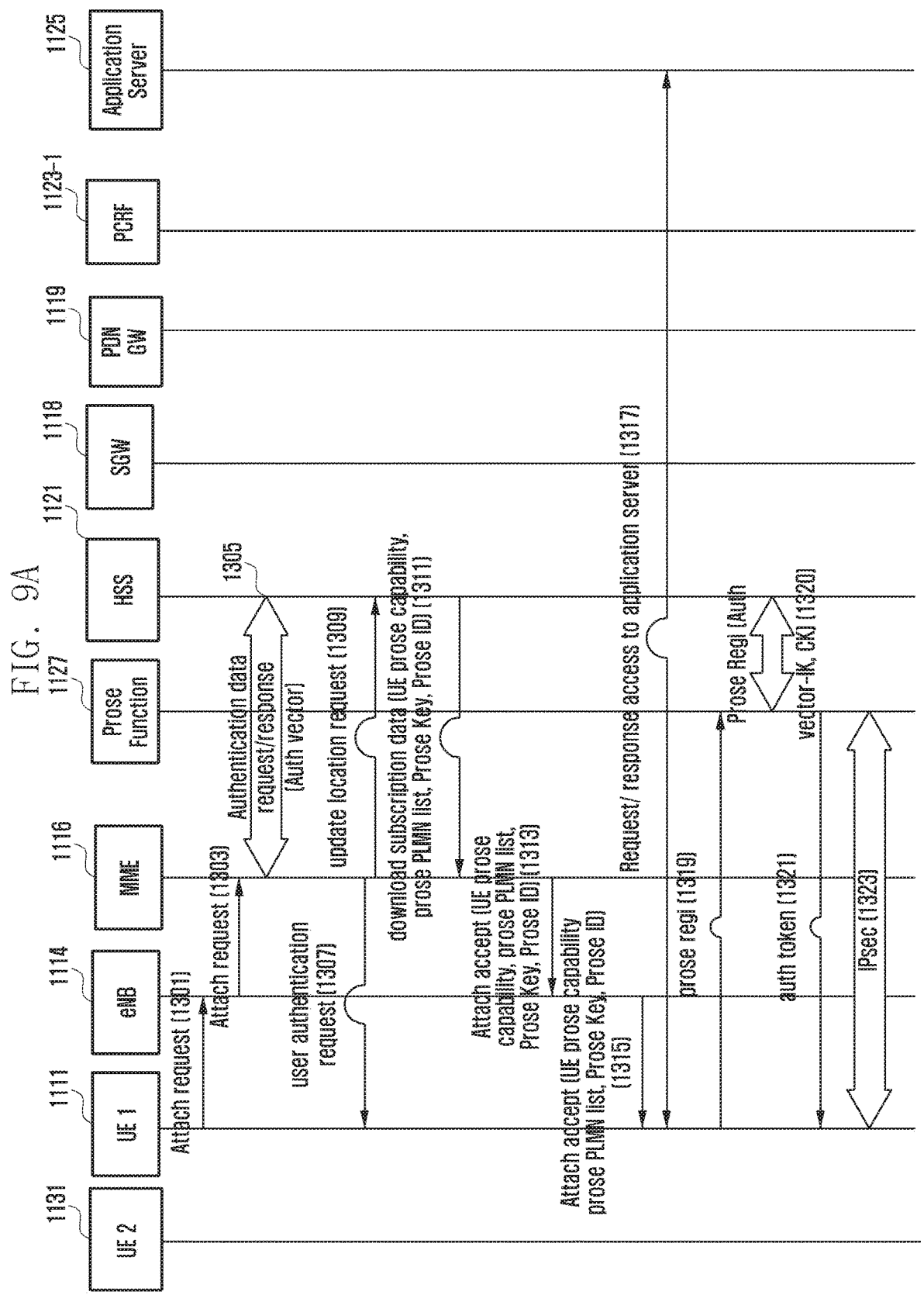

METHOD AND SYSTEM FOR SUPPORTING SECURITY AND INFORMATION FOR PROXIMITY BASED SERVICE IN MOBILE COMMUNICATION SYSTEM ENVIRONMENT

TECHNICAL FIELD

The present invention relates to a method for acquiring security related information for Proximity based security (Prose) search and prose communication by User Equipment (UE) in a mobile communication network.

BACKGROUND ART

Currently, in performing device-to-device communication in a communication system structure in the related art, there is not enough discussion on systems and schemes for security setting and management for device-to-device communication due to vulnerability according to security exposure of UE related information and other operational difficulties. Accordingly, the current device-to-device communication may cause problems of security vulnerability or inefficiency in performing the communication.

DISCLOSURE OF INVENTION

Technical Problem

The present invention has been made in order to solve the above problems, and an aspect of the present invention relates to Proximity based service (Prose) discovery and prose communication in performing device-to-device communication, and provides a method and a system that make it possible to perform safe communication in security through application of related information for the prose and schemes for security setting.

Solution to Problem

The present invention relates to schemes that make it possible to perform device-to-device communication in an evolved mobile communication system including 3GPP EPS and schemes for security setting and management in the device-to-device communication.

A device that intends to perform device-to-device communication through the present invention may acquire security information for performing the device-to-device communication, and may set security for performing the device-to-device communication.

In one aspect of the present invention, a security communication method for User Equipment (UE) for Proximity based services (Prose) includes: transmitting an attach request to an evolved Node B (eNB); receiving an attach response that includes security related information for the prose from the eNB; and performing device-to-device communication using the security related information.

In another aspect of the present invention, User Equipment (UE) configured to perform security communication in a network that provides Proximity based services (Prose) includes: a communication unit performing data communication with an evolved Node B (eNB); and a control unit transmitting an attach request to the eNB, receiving an attach response that includes security related information for the prose from the eNB, and controlling the communication unit to perform device-to-device communication using the security related information.

Advantageous Effects of Invention

In accordance with the present invention, In an environment, such as an Evolved Universal Terrestrial Radio Access Network (EUTRAN), a Universal Terrestrial Radio Access Network (UTRAN), or a GSM/EDGE Radio Access Network (GERAN), the device receives prose related capability for the prose discovery and the prose communication, a prose available PLMN list, and a security key for setting prose related security, and thus communication efficiency and security can be strengthened in the prose discovery and the prose communication.

BRIEF DESCRIPTION OF DRAWINGS

FIGS. 5A and 5B are flowcharts illustrating a security communication method that acquires security related information from a separate procedure according to an embodiment of the present invention;

FIG. 6 is a block diagram illustrating the configuration of UE that performs an operation according to the present invention;

FIGS. 8A, 8B, 9A, and 9B are flowcharts illustrating a security communication method according to another embodiment of the present invention;

MODE FOR THE INVENTION

Hereinafter, the operational principle according to preferred embodiments of the present invention will be described in detail with reference to the accompanying drawings. In describing the present invention, well-known functions or constructions incorporated herein are not described in detail since they would obscure the subject matter of the present invention in unnecessary detail. Further, all terms used in the description are defined in consideration of their functions in the present invention, but may differ depending on intentions of a user and an operator or customs. Accordingly, they should be defined on the basis of the contents of the whole description of the present disclosure.

The present invention relates to a system that enables a device to perform a communication function, and in this case, the device may include various devices, such as mobile communication terminals in the related art, machine type communication devices, consumer devices, and vending machines. The subject matter of the present invention is to provide a method for transferring and managing related information and performing communication in a safe environment so that various devices operate as User Equipments (UE) to perform Device-to-Device (D2D) discovery and D2D communication.

Hereinafter, in describing the present invention in detail, 3GPP based EPS system, UTRAN, and GERAN are assumed, but are not limited thereto. The present invention may also be applied to other mobile systems.

On the other hand, when the UE receives related information or performs security setting in performing the D2D communication, various modifications may be made within a range that does not deviate from the scope of the present invention.

On the other hand, the present invention relates to a management method that can make it possible to transfer related information and to perform safe communication through security setting when various devices including a communication UE intend to perform D2D communication in EUTRAN or 3GPP environment. This method can be applied to other mobile communication systems having a similar technical background and channel type, network architecture, a similar protocol, or a different protocol that performs similar operation, according to the judgment of a person skilled in the art to which the present invention pertains.

Figure 1:
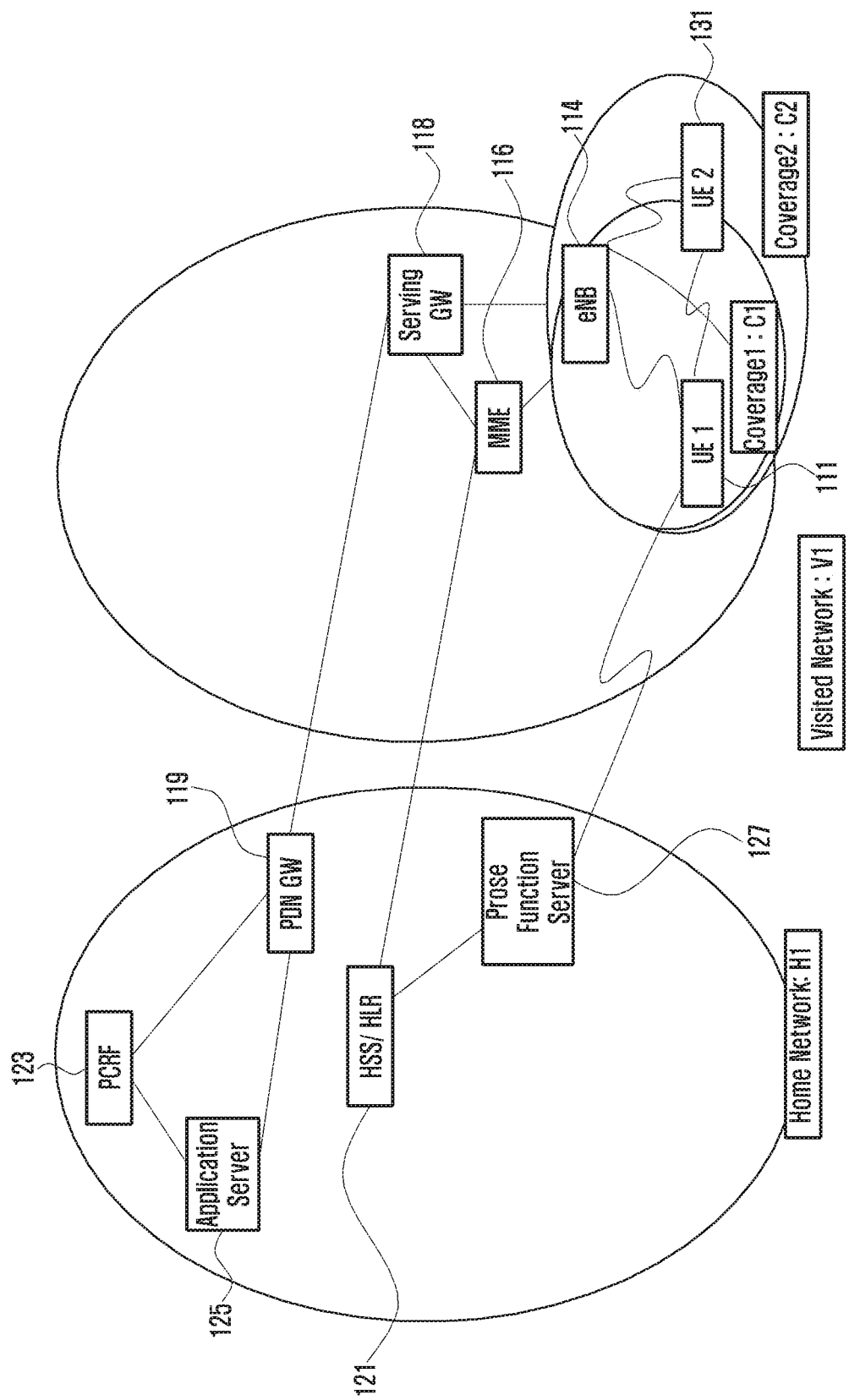
FIG. 1 is a diagram illustrating an example of a network structure to which the present invention is applied.

FIG. 1 is a diagram illustrating an example of a network structure to which the present invention is applied.

Specifically, FIG. 1 is a block diagram illustrating a home routing case in a network environment for security setting and communication for prose discovery or prose communication. The network structure illustrated in FIG. 1 is based on a 3GPP EPS system, and hereinafter, the features of the present invention will be described around the EUTRAN. However, the present invention can be used even in other similar mobile communication systems.

Referring to FIG. 1, User Equipment (UE) 111 and 131 may include various devices, such as mobile communication UE in the related art, devices that perform machine type communication, consumer devices, and vending machines.

FIG. 1 illustrates a home network H1 and a visited network V1 in consideration of a roaming environment. This network structure may provide an environment in which UE 1 111 and UE 2 131, which perform prose discovery and prose communication, may perform different operations depending on whether they are in the same coverage coverage1 or in different coverage coverage2. UE 1 111 may perform general EUTRAN communication through an evolved Node B (eNB) 114 and a Mobile Management entity (MME) 116, and may perform data communication through a serving gateway 118, and a PDN gateway 119. In the case of home routing as illustrated in FIG. 1, UE 1 111 performs data communication through the PDN gateway 119 in the home network H1.

On the other hand, in a network to which the present invention is applied, a prose function server 127 that performs prose related information exists to perform the prose function. The prose function server 127 verifies registration of prose related functions, transfer of related information, and prose related capability of the UE 111 and 131.

Home Subscriber Server (HSS) 121 transfers subscription information of the UE 111 and 131 and UE related security key information to the prose function server 127. The prose performs the prose function through an application server 125, and the application server 125 performs a prose related data service in association with a Policy and Charging Rules Function (PCRF) 123 in order to perform prose application.

According to the present invention, entities, such as the device or UE 111 and 131, the eNB 114, the MME 116, the prose function server 127, the HSS 121, and the application server 125, provide security communication setting and performing methods that make it possible to perform proximity based service, prose discovery, and prose communication on the basis of protocols used in the mobile communication and Internet communication. Hereinafter, the detailed contents thereof will be described with reference to FIGS. 3A and 3B.

Figure 2:
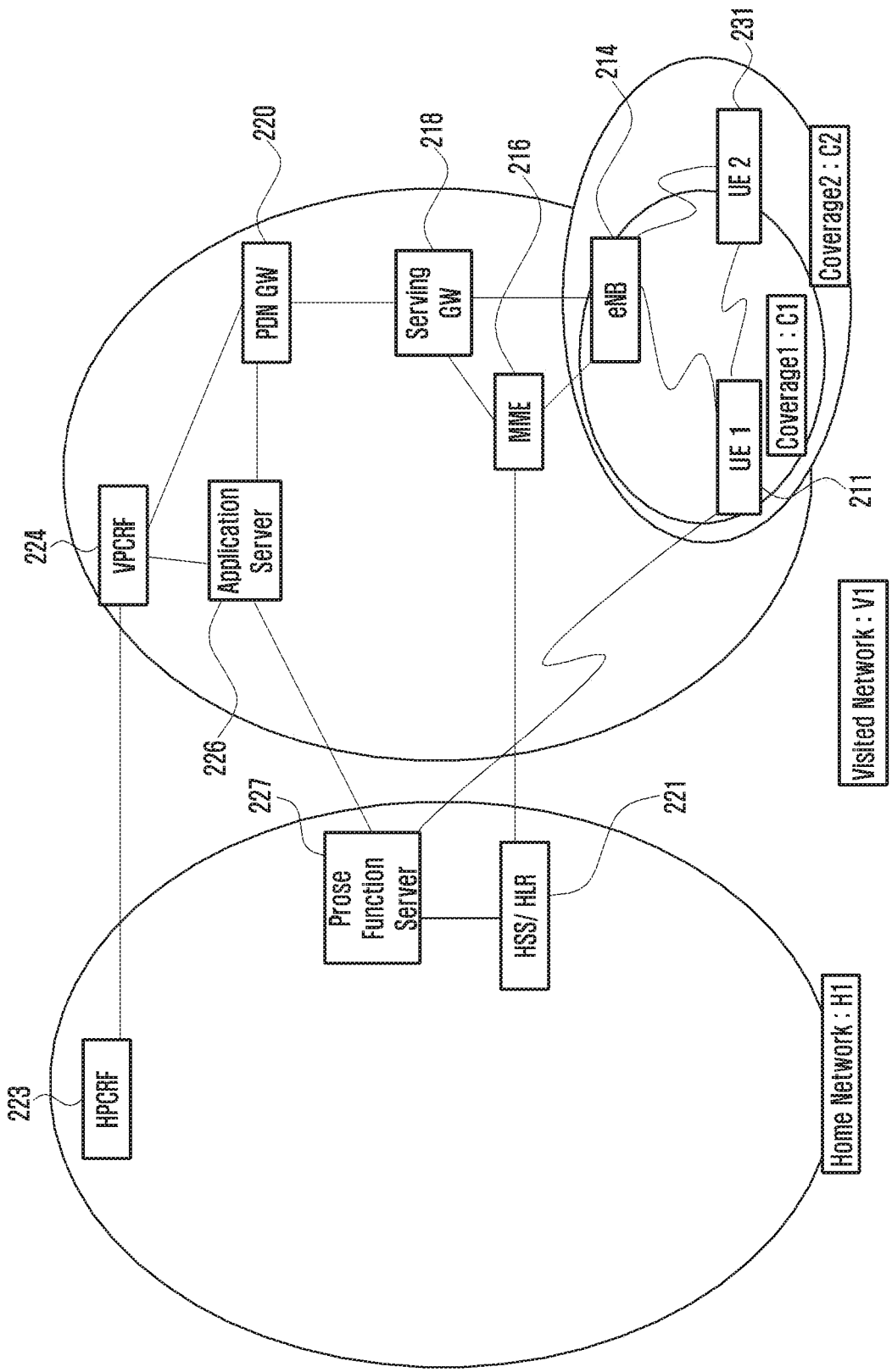
FIG. 2 is a diagram illustrating another example of a network structure to which the present invention is applied.

FIG. 2 is a diagram illustrating another example of a network structure to which the present invention is applied. Specifically, FIG. 2 is a block diagram illustrating a local breakout case in an environment for security setting of the prose discovery and the prose communication and for the prose communication. As compared with the network structure of FIG. 1, in the network structure of FIG. 2, a PDN gateway 220 and an application server 226 exist in a visited network V1, and a HPCRF 223 and a visited PCRF (vPCRF) 224 are additionally provided.

Figure 3A:
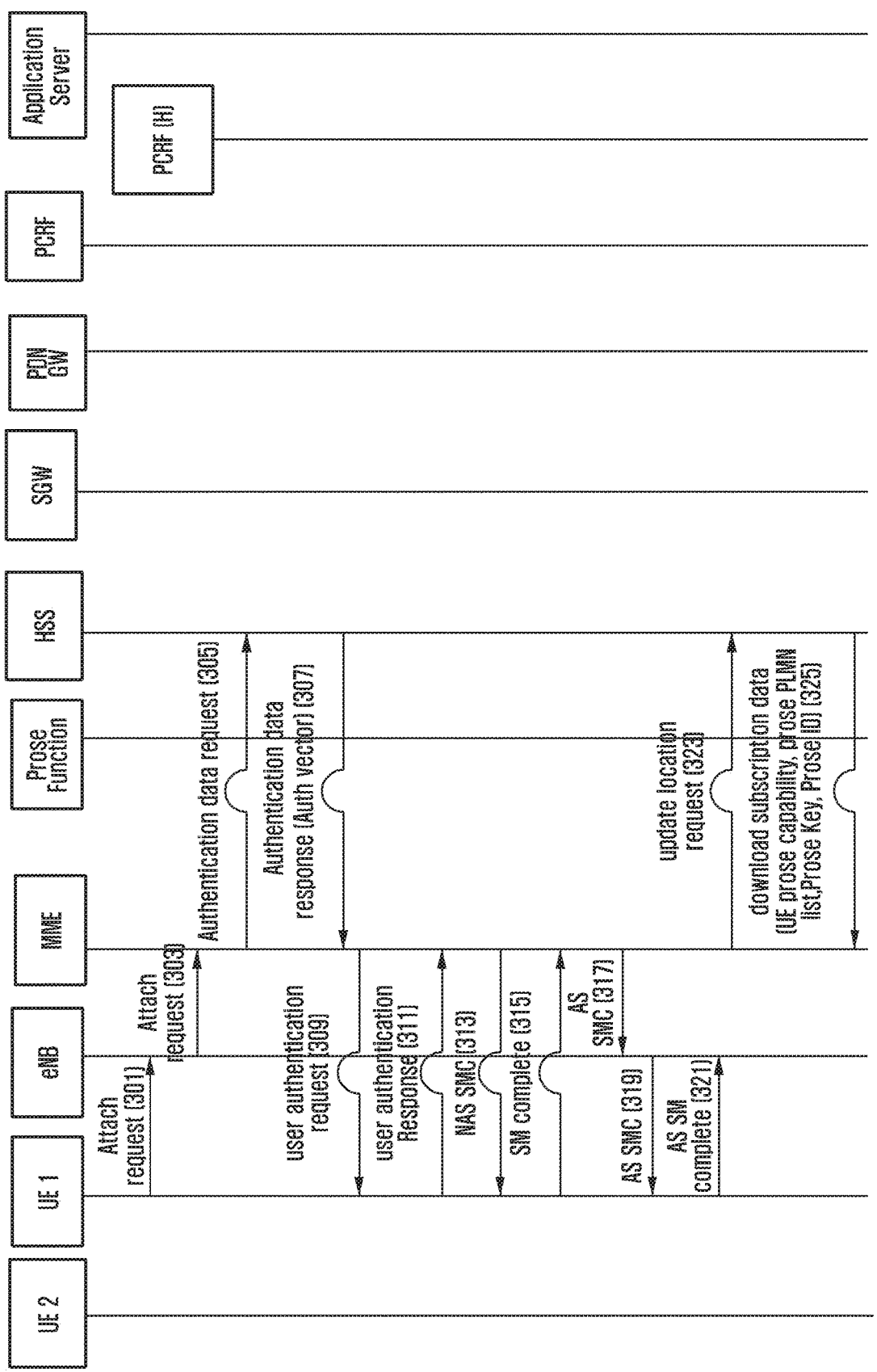
FIGS. 3A and 3B are flowcharts illustrating a security communication method that acquires security related information from a UE registration process according to an embodiment of the present invention.
Figure 3B:
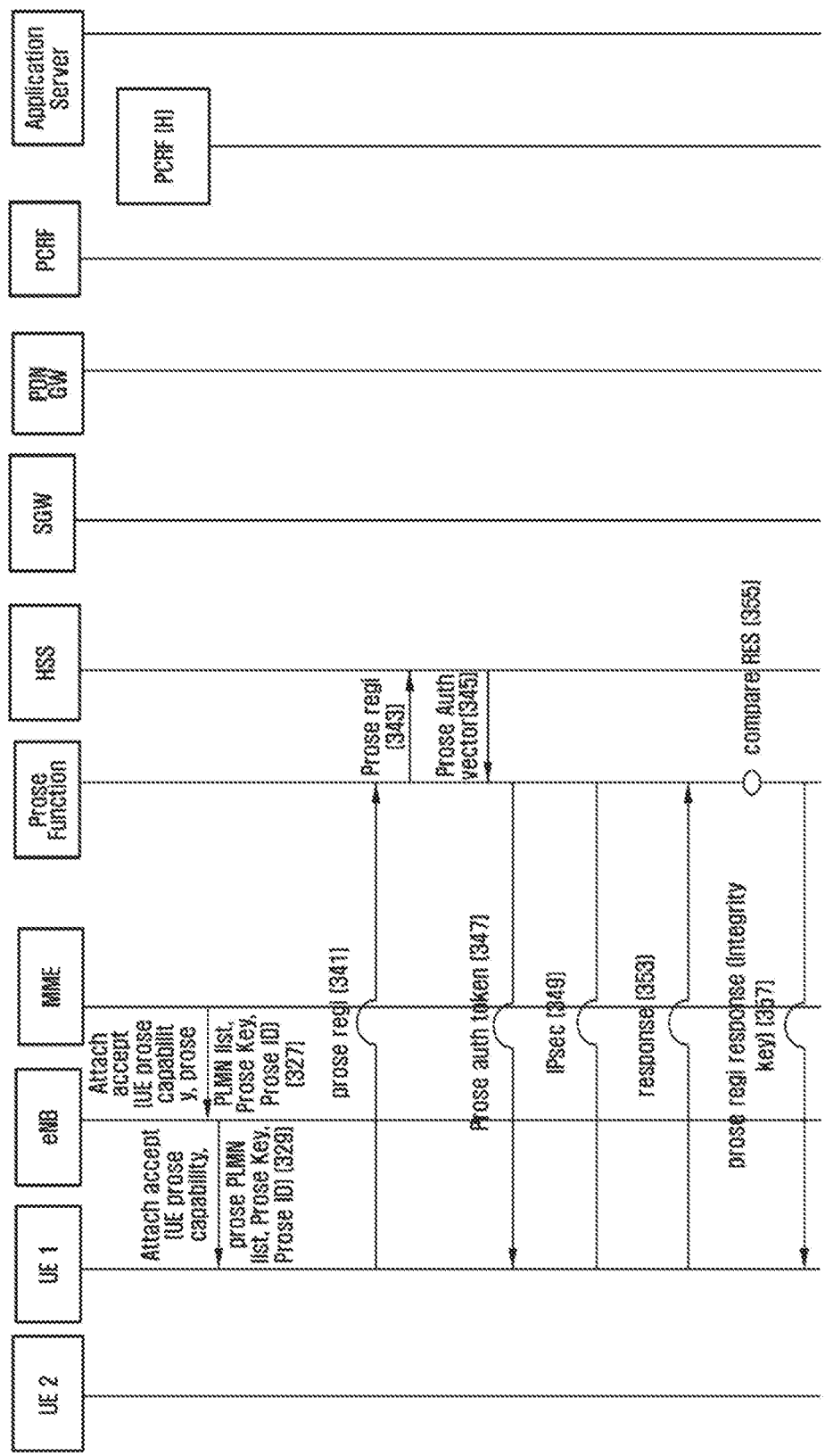

FIGS. 3A and 3B are flowcharts illustrating a security communication method according to an embodiment of the present invention. Specifically, FIGS. 3A and 3B illustrate security setting for the prose discovery and the prose communication and a security communication procedure according to an embodiment of the present invention. In an embodiment of FIGS. 3A and 3B, the UE acquires a security key for the prose discovery and the prose communication and security setting related information in a registration process.

At operation 301, the UE 1 performs a registration procedure through transmission of an attach request message to the eNB. At operation 303, the eNB transfers the attach request message that is transmitted by the UE 1 to the MME.

At operation 305, the MME transmits an authentication data request message to the HSS. Thereafter, at operation 307, the HSS transmits security related information that includes an authentication vector and the like to the MME.

At operation 309, the MME transmits a user authentication request message that includes a UE Authentication Token (AUTN) to the UE 1. At operation 311, the UE 1 transmits a Response Security value (RES) to the MME together with a user authentication response message.

At operation 313, the MME transmits a NAS SMC message to the UE 1. At operation 315, the UE 1 transmits a security mode complete message to the MME.

At operation 317, the MME transmits an Access Stratum (AS) security mode command message to the eNB. At operation 319, the eNB transfers the AS security mode command message to the UE 1. At operation 321, the UE 1 transmits an AS security mode complete message to the eNB.

At operation 323, the MME transmits an update location request message to the HSS. At operation 325, the HSS transmits subscription data to the MME. In this case, the HSS also transfers information, such as a prose identity for performing the prose service, prose related capacity of the UE 1, a proximity related security key, and a prose PLMN list, to the MME. The proximity related security key is a security key for proximity discovery or proximity communication, and in an embodiment, it may be a group key.

At operation 327, the MME transmits an attach accept message to the eNB, and at operation 329, the eNB transfers the attach accept message to the UE 1. At operation 327 and operation 329, information, such as a prose identity for performing a prose service that is transferred from the HSS at operation 325, a prose related capacity of the UE, a proximity related security key, and a prose PLMN list, may also be transferred.

At operation 341, the UE 1 transmits a prose registration request message to the prose function. In this process, a public key of the UE 1 to be used when the UE 1 performs communication with another UE may be transmitted to the prose function. The transmitted public key of the UE 1 is stored in the prose function. The UE 1 may receive its own public key from a key authentication center or may transmit a request message to the prose function so that the prose function receives the public key of the UE 1 from the key authentication center. The prose registration request message may include prose function Identity (ID) information.

Figure 11:
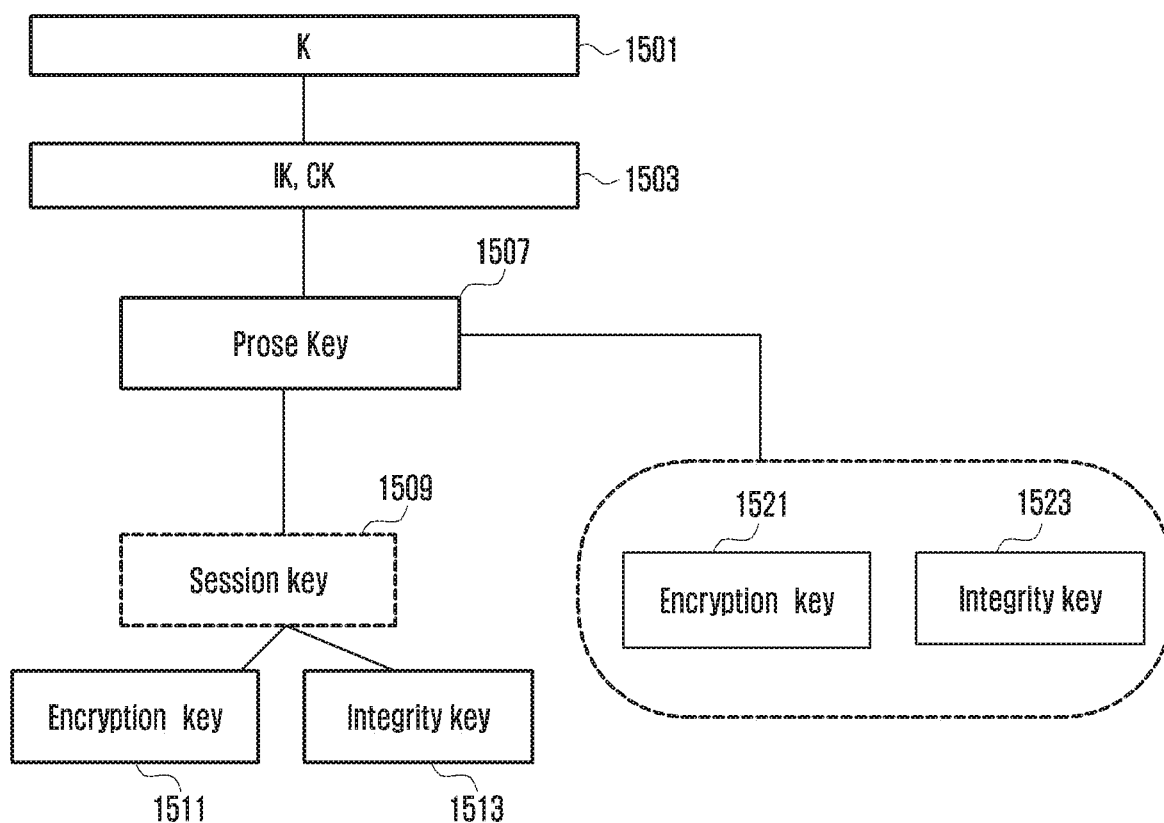
FIGS. 11 and 12 are flowcharts illustrating a key management method for security communication according to another embodiment of the present invention.

At operation 343, the prose function transmits the prose registration request message to the HSS. The prose registration request message may include prose function Identity (ID) information. The prose function ID may be transmitted from the prose function to the HSS through a message or may be transmitted from the UE to the HSS. Thereafter, as illustrated in FIG. 11, the HSS may generate a prose key.

At operation 345, the HSS transmits a prose authentication vector to the prose function. At operation 347, the prose function transmits a prose authentication token to the UE 1. At operation 349, the UE 1 and the prose function perform IPsec setting. As illustrated in FIG. 11, the UE 1 may generate the prose key.

At operation 353, the UE 1 transmits a message that includes a response value to the authentication token received from the prose function for prose registration to the prose function. At operation 355, the prose function compares and verifies RES and XRES information. At operation 357, the prose function transmits a prose registration response message to the UE 1, and at this time, a security key for protecting communication between the prose function and the UE 1 and an integrity key are transmitted. If there are several other UEs that can communicate with the UE 1, the UE 1 may receive a public key of another UE from the prose function. That is, the prose function may transmit the public key of another UE to the registered UE (e.g., UE 1).

Figure 4A:
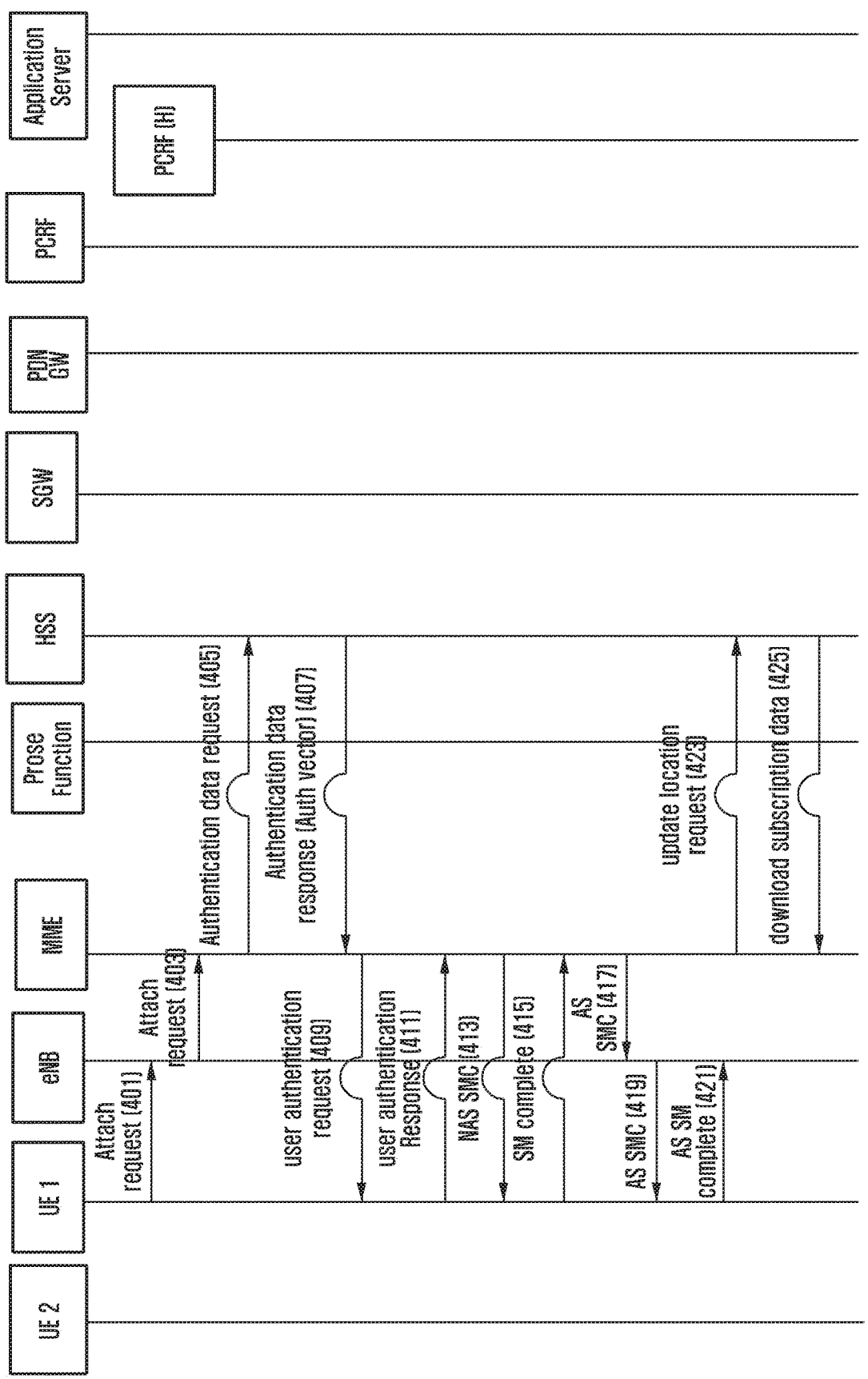
FIGS. 4A and 4B are flowcharts illustrating a security communication method that acquires security related information from a prose registration process according to an embodiment of the present invention.
Figure 4B:
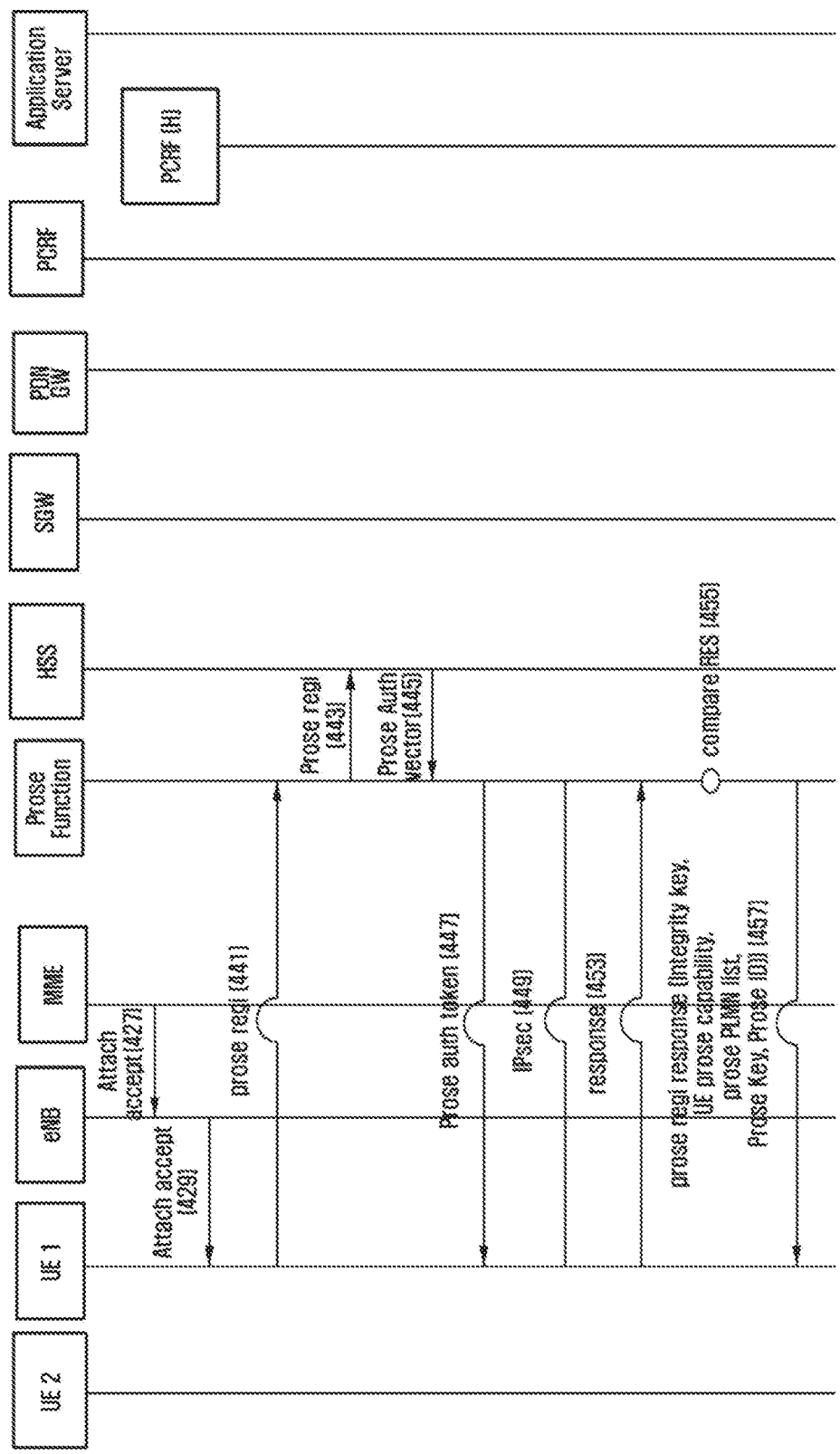

FIGS. 4A and 4B are flowcharts illustrating a security communication method according to an embodiment of the present invention. Specifically, FIGS. 4A and 4B illustrate security setting for the prose discovery and the prose communication and a security communication procedure according to an embodiment of the present invention. In an embodiment of FIGS. 4A and 4B, the UE acquires a security key for the prose discovery and the prose communication and security setting related information in a proximity based service registration process for performing prose registration.

At operation 401, the UE 1 performs a registration procedure through transmission of an attach request message to the eNB. At operation 403, the eNB transfers the attach request message that is transmitted by the UE 1 to the MME.

At operation 405, the MME transmits an authentication data request message to the HSS. Thereafter, at operation 407, the HSS transmits security related information that includes an authentication vector and the like to the MME.

At operation 409, the MME transmits a user authentication request message that includes a UE Authentication Token (AUTN) to the UE 1. At operation 411, the UE 1 transmits a Response Security value (RES) to the MME together with a user authentication response message.

At operation 413, the MME transmits a Non-Access Stratum Security Command (NAS SMC) message to the UE 1. At operation 415, the UE 1 transmits a security mode complete message to the MME.

At operation 417, the MME transmits an Access Stratum (AS) security mode command message to the eNB. At operation 419, the eNB transfers the AS security mode command message to the UE 1. At operation 421, the UE 1 transmits an AS security mode complete message to the eNB.

At operation 423, the MME transmits an update location request message to the HSS. At operation 425, the HSS transmits subscription data to the MME.

At operation 427, the MME transmits an attach accept message to the eNB, and at operation 429, the eNB transfers the attach accept message to the UE 1.

At operation 441, the UE 1 transmits a prose registration request message to the prose function. In this process, a public key of the UE 1 to be used when the UE 1 performs communication with another UE may be transmitted to the prose function. The transmitted public key of the UE 1 is stored in the prose function. The UE 1 may receive its own public key from a key authentication center or may transmit a request message to the prose function so that the prose function receives the public key of the UE 1 from the key authentication center. The prose registration request message may include prose function Identity (ID) information.

At operation 443, the prose function transmits the prose registration request message to the HSS. The prose registration request message may include prose function Identity (ID) information. The prose function ID may be transmitted from the prose function to the HSS through a message or may be transmitted from the UE to the HSS. Thereafter, as illustrated in FIG. 11, the HSS may generate a prose key.

At operation 445, the HSS transmits a prose authentication vector to the prose function.

At operation 447, the prose function transmits a prose authentication token to the UE 1. At operation 449, the UE 1 and the prose function perform IPsec setting. As illustrated in FIG. 11, the UE may generate the prose key.

At operation 453, the UE 1 transmits a message that includes a response value to the authentication token received from the prose function for prose registration to the prose function. At operation 455, the prose function compares and verifies RES and XRES information. At operation 457, the prose function transmits a prose registration response message to the UE 1. At this time, the prose function also transmits a security key for protecting communication between the prose function and the UE 1 and an integrity key. Further, the prose function also transfers information, such as a prose identity for performing the prose service, prose related capacity of the UE 1, a proximity related security key, and a prose PLMN list. The proximity related security key is a security key for proximity discovery or proximity communication, and as an example, it may be a group key. If there are several other UEs that can communicate with the UE 1, the UE 1 may receive a public key of another UE from the prose function. That is, the prose function may transmit the public key of another UE to the registered UE (e.g., UE 1).

FIGS. 5A and 5B are flowcharts illustrating a security communication method according to an embodiment of the present invention. Specifically, FIGS. 5A and 5B illustrate security setting for the prose discovery and the prose communication and a security communication procedure. In an embodiment of FIGS. 5A and 5B, a security key for the prose discovery and the prose communication and security setting related information are acquired through a separate procedure after the UE registration and prose registration are completed.

At operation 501, the UE 1 performs a registration procedure through transmission of an attach request message to the eNB. At operation 503, the eNB transfers the attach request message that is transmitted by the UE 1 to the MME.

At operation 505, the MME transmits an authentication data request message to the HSS. Thereafter, at operation 507, the HSS transmits security related information that includes an authentication vector and the like to the MME.

At operation 509, the MME transmits a user authentication request message that includes a UE Authentication Token (AUTN) to the UE 1. At operation 511, the UE 1 transmits a Response Security value (RES) to the MME together with a user authentication response message.

At operation 513, the MME transmits a Non-Access Stratum Security Command (NAS SMC) message to the UE 1. At operation 515, the UE 1 transmits a security mode complete message to the MME.

At operation 517, the MME transmits an Access Stratum (AS) security mode command message to the eNB. At operation 519, the eNB transfers the AS security mode command message to the UE 1. At operation 521, the UE 1 transmits an AS security mode complete message to the eNB.

At operation 523, the MME transmits an update location request message to the HSS. At operation 525, the HSS transmits subscription data to the MME.

At operation 527, the MME transmits an attach accept message to the eNB, and at operation 529, the eNB transfers the attach accept message to the UE 1.

At operation 541, the UE 1 transmits a prose registration request message to the prose function. In this process, a public key of the UE 1 to be used when the UE 1 performs communication with another UE may be transmitted to the prose function. The transmitted public key of the UE 1 is stored in the prose function. The UE 1 may receive its own public key from a key authentication center or may transmit a request message to the prose function so that the prose function receives the public key of the UE 1 from the key authentication center. The prose registration request message may include prose function Identity (ID) information.

At operation 543, the prose function transmits the prose registration request message to the HSS. The prose registration request message may include prose function Identity (ID) information. The prose function ID may be transmitted from the prose function to the HSS through a message or may be transmitted from the UE to the HSS. Thereafter, as illustrated in FIG. 11, the HSS may generate a prose key.

At operation 545, the HSS transmits a prose authentication vector to the prose function.

At operation 547, the prose function transmits a prose authentication token to the UE 1. At operation 549, the UE 1 and the prose function perform IPsec setting. As illustrated in FIG. 11, the UE may generate the prose key.

At operation 553, the UE 1 transmits a message that includes a response value to the authentication token received from the prose function for prose registration to the prose function. At operation 555, the prose function compares and verifies RES and XRES information. At operation 557, the prose function transmits a prose registration response message to the UE 1, and at this time, a security key for protecting communication between the prose function and the UE 1 and an integrity key are transmitted.

Further, at operation 559, the prose function transfers at least one of a prose identity for performing the prose service, prose related capacity of the UE 1, a proximity related security key, and a prose PLMN list to the UE 1. The operation 559 may be performed through the communication between the UE 1 in which security such as integrity protect is performed and the prose function. The proximity related security key is a security key for proximity discovery or proximity communication, and as an example, it may be a group key.

If there are several other UEs that can communicate with the UE 1, the UE 1 may receive a public key of another UE from the prose function. That is, the prose function may transmit the public key of another UE to the registered UE (e.g., UE 1).

At operation 561, in response to this, the UE 1 transmits a response message to the prose parameter transmission to the prose function.

FIG. 6 is a block diagram illustrating the configuration of UE that performs an operation according to the present invention.

Referring to FIG. 6, the UE 600 may include a communication unit 610, a control unit 620, and a storage unit 630.

The communication unit 610 performs data communication with the eNB, the MME, the prose function, or the HSS under the control of the control unit 620.

The control unit 620 controls other constituent elements, such as the communication unit 610 and the storage unit 630, to perform the above-described operations according to the present invention.

The storage unit 630 temporarily or permanently store the security related information that is acquired by the control unit 620.

Figure 7:
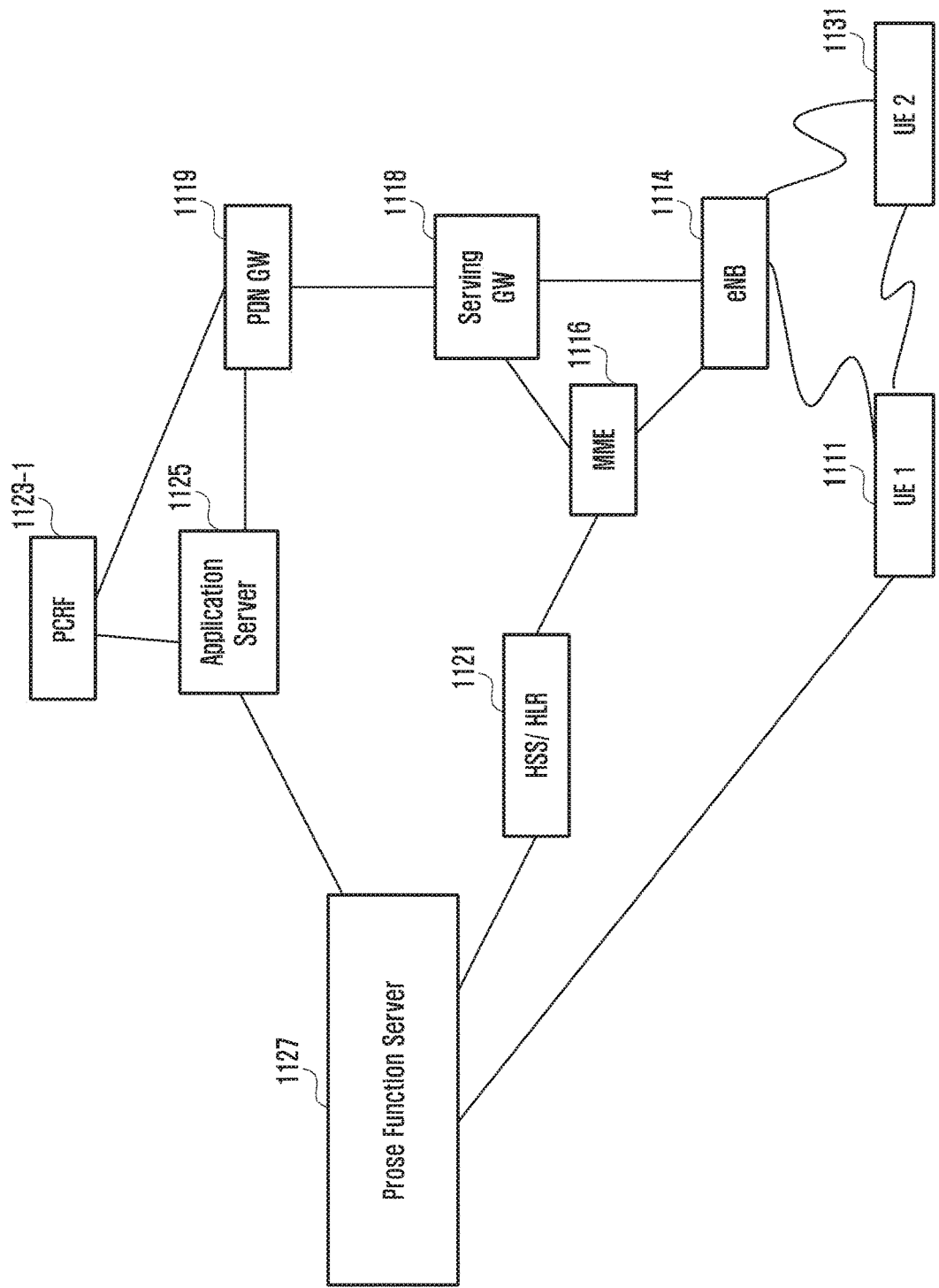
FIG. 7 is a diagram illustrating an example of a network structure to which another embodiment of the present invention is applied.

FIG. 7 is a diagram illustrating an example of a network structure to which another embodiment of the present invention is applied. The network structure illustrated in FIG. 7 is based on a 3GPP EPS system, and hereinafter, the features of the present invention will be described around the EUTRAN. However, the present invention can be used even in other similar mobile communication systems.

Referring to FIG. 7, User Equipment (UE) 1111 and 1131 may include various devices, such as mobile communication UE in the related art, devices that perform machine type communication, and consumer devices.

The network structure illustrated in FIG. 7 may provide an environment in which UE 1 1111 and UE 2 1131 perform prose discovery and prose communication. UE 1 1111 may perform general EUTRAN communication through an eNB 1114 and an MME 1116, and may perform data communication through a serving gateway 1118, and a PDN gateway 1119. On the other hand, in a network to which the present invention is applied, a prose function server 1127 that performs prose related information exists to perform the prose function. The prose function server 1127 verifies registration of a prose related functions, transfer of related information, and prose related capability of the UE 1111 and 1131, and performs prose authentication.

HSS 1121 transfers subscription information of the UE 1111 and 1131 and UE related security key information to the prose function server 1127. The prose performs a prose application server function through an application server 1125, and the application server 1125 performs a prose related data service in association with a Policy and Charging Rules Function (PCRF) 1123-1 in order to perform prose application.

According to the present invention, entities, such as the device or UE 1111 and 1131, the eNB 1114, the MME 1116, the prose function server 1127, the HSS 1121, and the application server 1125, provide security communication setting and performing methods that make it possible to perform proximity based service, prose discovery, and prose communication on the basis of protocols used in the mobile communication and Internet communication. Hereinafter, the detailed contents thereof will be described.

FIGS. 8A and 8B are flowcharts illustrating a security communication method according to another embodiment of the present invention. Specifically, FIGS. 8A and 8B illustrate an authentication method for the prose discovery and the prose communication and a security key setting method using a key obtained by deriving security key setting related information through the prose function server.

At operation 1201, the UE performs a registration procedure through transmission of an attach request message to the eNB. At operation 1203, the eNB transfers the attach request message that is transmitted by the UE to the MME.

At operation 1205, the MME transmits an authentication data request message to the HSS, and the HSS transmits security related information that includes an authentication vector and the like to the MME.

At operation 1207, the MME transmits a user authentication request message that includes an Authentication Token (AUTN) to the UE, and the UE transmits a Response Security value (RES) to the MME together with a user authentication response message.

At operation 1208, the UE performs a NAS Security Mode Command (SMC) with the MME, and thereafter the MME, the eNB, and the UE perform AS SMC processes.

At operation 1209, the MME transmits an update location request message to the HSS. At operation 1211, the HSS transmits subscription data to the MME. In this case, the HSS also transfers information, such as a prose identity for performing the prose service, a prose group identity, a prose related capacity of the UE, a proximity related security key if there are the registered prose identity and security key, and a prose PLMN list, to the MME. The proximity related security key is a security key for proximity discovery or proximity communication. If there exists already registered information on the proximity related security key, the HSS inquires and transfers the registered information to the MME, whereas if there does not exist the registered information, the HSS performs subsequent authentication and then generates the proximity related security key.

At operation 1213, the MME transmits an attach accept message to the eNB, and at operation 1215, the eNB transfers the attach accept message to the UE. At operation 1213 and operation 1215, information, such as a prose identity for performing a prose service that is transferred from the HSS at operation 1211, a prose related capacity of the UE, a proximity related security key, a prose group key, a prose group identity, and a prose PLMN list, may also be transferred.

At operation 1217, the UE transmits a prose registration request message to the prose function. In this process, a public key of the UE to be used when the UE performs communication with another UE may be transmitted to the prose function. The transmitted public key of the UE is stored in the prose function. The UE may receive its own public key from a key authentication center or may transmit a request message to the prose function so that the prose function receives the public key of the UE from the key authentication center. Such a prose registration request message may include prose function Identity (ID) information.

At operation 1218, the prose function transmits the prose registration request message to the HSS. The prose registration request message may include prose function Identity (ID) information. The prose function ID may be transmitted from the prose function to the HSS through a message or may be transmitted from the UE to the HSS. Thereafter, as illustrated in FIG. 11, the HSS may generate a prose key. Thereafter, the HSS transmits a prose authentication vector to the prose function. The authentication vector may include a Cipher Key (hereinafter, referred to as "CK") and an Integrity Key (hereinafter, referred to as "IK"). Further, the authentication vector may include the generated prose key. In an embodiment, the HSS may separately transmit the prose key to the prose function regardless of the pros authentication vector.

At operation 1219, the prose function transmits a prose authentication token to the UE. At operation 1220, the UE and the prose function perform IPsec setting. As illustrated in FIG. 11, the UE may generate the prose key.

At operation 1221, the UE transmits a message that includes a response value to the authentication token received from the prose function for the prose registration to the prose function. At operation 1223, the prose function compares and verifies RES and XRES information. At operation 1223, the prose function transmits a prose registration response message to the UE, and at this time, a security key for protecting the communication between the prose function and the UE, an integrity key to protect the communication between the UE and an application server, and an encryption key seed are also transmitted. If there are several other UEs that can communicate with the UE 1, the UE 1 may receive public keys of the other UEs from the prose function. That is, the prose function may transmit the public keys of the other UEs to the registered UE (e.g., UE 1).

At operation 1225, the UE transfers a request for connecting to the application server to the prose function, and at operation 1226, the prose function requests information on the application server from the HSS. At operation 1227, the HSS transfers application server related information to the prose function. The application server related information may include information on an IP address for connecting to the application server. In another embodiment of the present invention, the operation 1225 to operation 1226 may be omitted.

At operation 1231-1, the UE may generate the prose key for the prose communication, and the prose key is used to perform communication between the UE and the application. The prose key may be generated from the IK and the CK or may be generated using $K_{ASME}$.

At operation 1231-3, the prose function may generate the prose key from the IK and the CK, and may generate the prose key from the $K_{ASME}$. In the case of generating the prose key from the IK and the CK, the value that is transferred from the HSS may be used, whereas in the case of generating the prose key from the $K_{ASME}$, the $K_{ASME}$ may be provided from the MME or a structure in which the prose function and the MME are combined with each other. At operation 1234, the prose function updates the changed prose security key information in the HSS.

At operation 1235, the prose function may transfer the prose key and related information that the UE has registered for the prose service in the prose function in the registration process to the application server. Further, seed information for the integrity key and the encryption key may also be transferred. At operation 1237, at least one piece of information, such as the prose key, the integration key seed, and the encryption key seed, may be stored. Thereafter, at operation 1239, the UE and the application server perform communication using the prose key and the prose identity.

On the other hand, like operation 1241, the UE and another UE may perform communication using the prose key or the prose Identity (ID).

Figure 9B:
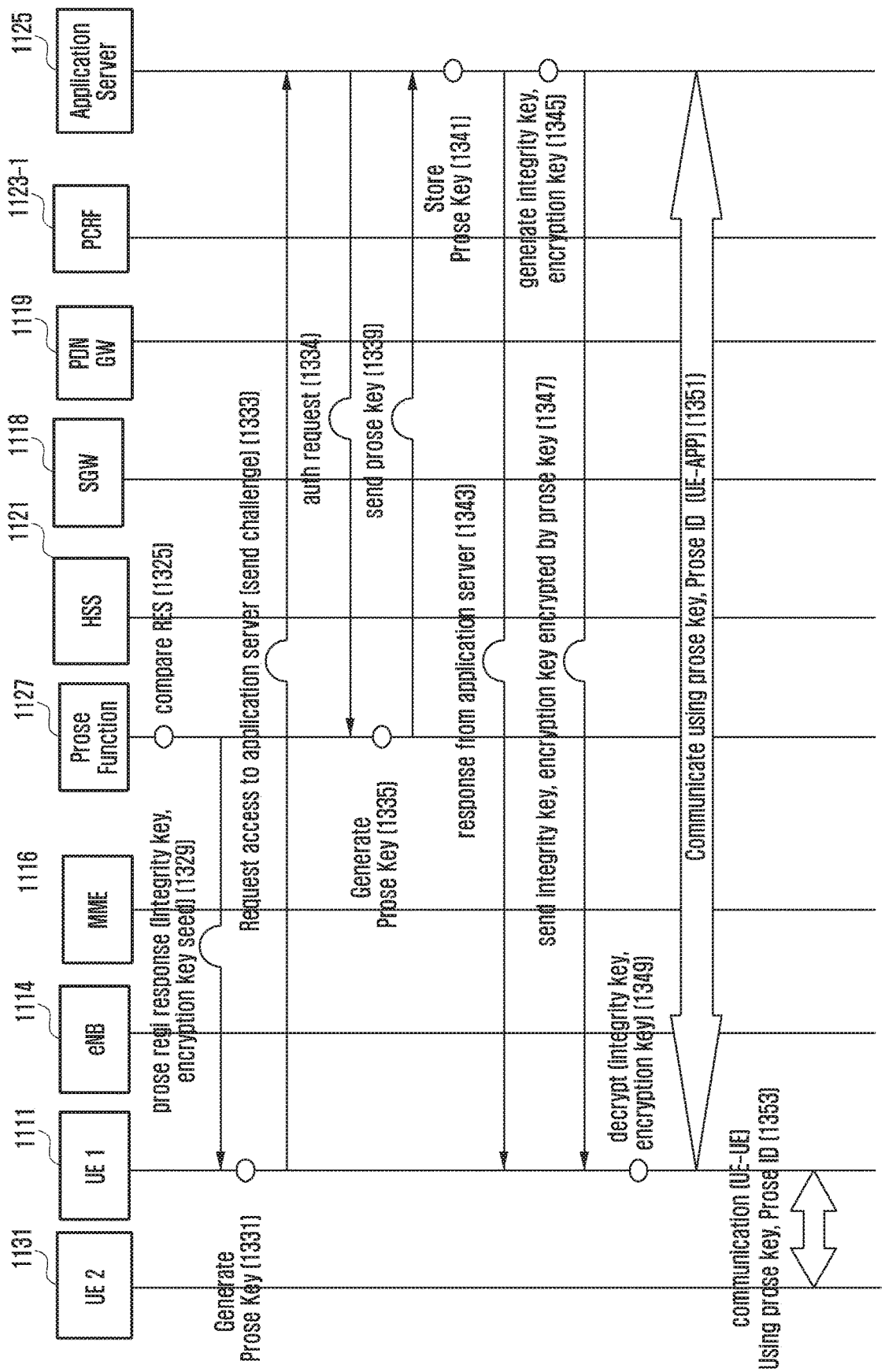

FIGS. 9A and 9B are flowcharts illustrating a security communication method according to another embodiment of the present invention. Specifically, FIGS. 9A and 9B are message flow charts illustrating a communication and security procedure for authentication and security of the prose discovery and the prose communication according to an embodiment of the present invention.

At operation 1301, the UE performs a registration procedure through transmission of an attach request message to the eNB. At operation 1303, the eNB transfers the attach request message that is transmitted by the UE to the MME.

At operation 1305, the MME transmits an authentication data request message to the HSS, and the HSS transmits security related information that includes an authentication vector and the like to the MME.

At operation 1307, the MME transmits a user authentication request message that includes an Authentication Token (AUTN) to the UE, and the UE transmits a Response Security value (RES) to the MME together with a user authentication response message.

At operation 1308, the UE performs a NAS Security Mode Command (SMC) with the MME, and thereafter, the MME, the eNB, and the UE perform AS SMC processes.

At operation 1309, the MME transmits an update location request message to the HSS. At operation 1311, the HSS transmits subscription data to the MME. In this case, the HSS also transfers information, such as a prose identity for performing the prose service, a prose group identity, a prose related capacity of the UE, a proximity related security key if there are the registered prose identity and security key, and a prose PLMN list, to the MME. The proximity related security key is a security key for proximity discovery or proximity communication. If there exists already registered information on the proximity related security key, the HSS inquires and informs the registered information, whereas if there does not exist the registered information, the HSS performs subsequent authentication and then generates the proximity related security key.

At operation 1313, the MME transmits an attach accept message to the eNB, and at operation 1315, the eNB transfers the attach accept message to the UE. At operation 1313 and operation 1315, information, such as a prose identity for performing a prose service that is transferred from the HSS at operation 1311, a prose related capacity of the UE, a proximity related security key, a prose group key, a prose group identity, and a prose PLMN list, may also be transferred.

At operation 1317, the UE transmits an access request message to an application server, and the application server performs triggering so that the UE passes through an authentication and bootstrapping process.

At operation 1319, the UE transmits a registration request message to the prose function. In this process, a public key of the UE to be used when the UE performs communication with another UE may be transmitted to the prose function. The transmitted public key of the UE is stored in the prose function. The UE may receive its own public key from a key authentication center or may transmit a request message to the prose function so that the prose function receives the public key of the UE from the key authentication center. Such a prose registration request message may include prose function Identity (ID) information.

At operation 1320, the prose function transmits the prose registration request message to the HSS. The prose registration request message may include prose function Identity (ID) information. The prose function ID may be transmitted from the prose function to the HSS through a message or may be transmitted from the UE to the HSS. Thereafter, as illustrated in FIG. 11, the HSS may generate a prose key. Thereafter, the HSS transmits a prose authentication vector to the prose function. The authentication vector may include a Cipher Key (hereinafter, referred to as "CK") and an Integrity Key (hereinafter, referred to as "IK"). Further, the authentication vector may include the generated prose key. The HSS may separately transmit the prose key to the prose function regardless of the pros authentication vector.

At operation 1323, IPsec setting is performed between the UE and the prose function. As illustrated in FIG. 11, the UE may generate the prose key.

At operation 1325, a message that includes a response value to an authentication token that is transmitted from the prose function to the UE for the prose registration is transmitted from the UE to the prose function, and the prose function compares and verifies RES and XRES information.

At operation 1329, a prose registration response message is transmitted from the prose function to the UE, and at this time, a security key for protecting the communication between the prose function and the UE, an integrity key to protect the communication between the UE and the application server, and an encryption key seed are also transmitted.

If there are several other UEs that can communicate with the UE 1, the UE 1 may receive public keys of the other UEs from the prose function. That is, the prose function may transmit the public keys of the other UEs to the registered UE (e.g., UE 1).

At operation 1331, the UE may generate the prose key for performing prose communication, and the prose key is used to perform communication between the UE and the application. The prose key may be generated from the IK and the CK.

At operation 1333, the UE transmits an access request to the application server. At operation 1334, the application server transmits an authentication request message to the prose function.

At operation 1335, the prose function may generate the prose key from the IK and the CK, or may generate the prose key from the $K_{ASME}$. In the case of generating the prose key from the IK and the CK, the value that is transferred from the HSS may be used, whereas in the case of generating the prose key from the $K_{ASME}$, the $K_{ASME}$ may be provided from the MME or a structure in which the prose function and the MME are combined with each other. At operation 1339, the prose function transfers the prose key and related information that is registered for the prose service to the application server. Further, seed information for the integrity key and the encryption key may also be transferred. At operation 1341, at least one piece of information, such as the prose key, the integration key seed, and the encryption key seed, may be stored.

At operation 1343, the application server transmits a response message to the UE. At operation 1343, the application server generates the integrity key and the encryption key. At operation 1347, the encryption key and the integrity key are generated by the prose key to be transmitted. At operation 1349, the UE decrypts the encryption key and the integrity key through the prose key.

Thereafter, at operation 1351, the UE and the application server perform communication using the prose key and the prose identity. On the other hand, like operation 1353, the UE and another UE may perform communication using the prose key or the prose Identity (ID).

Figure 10:
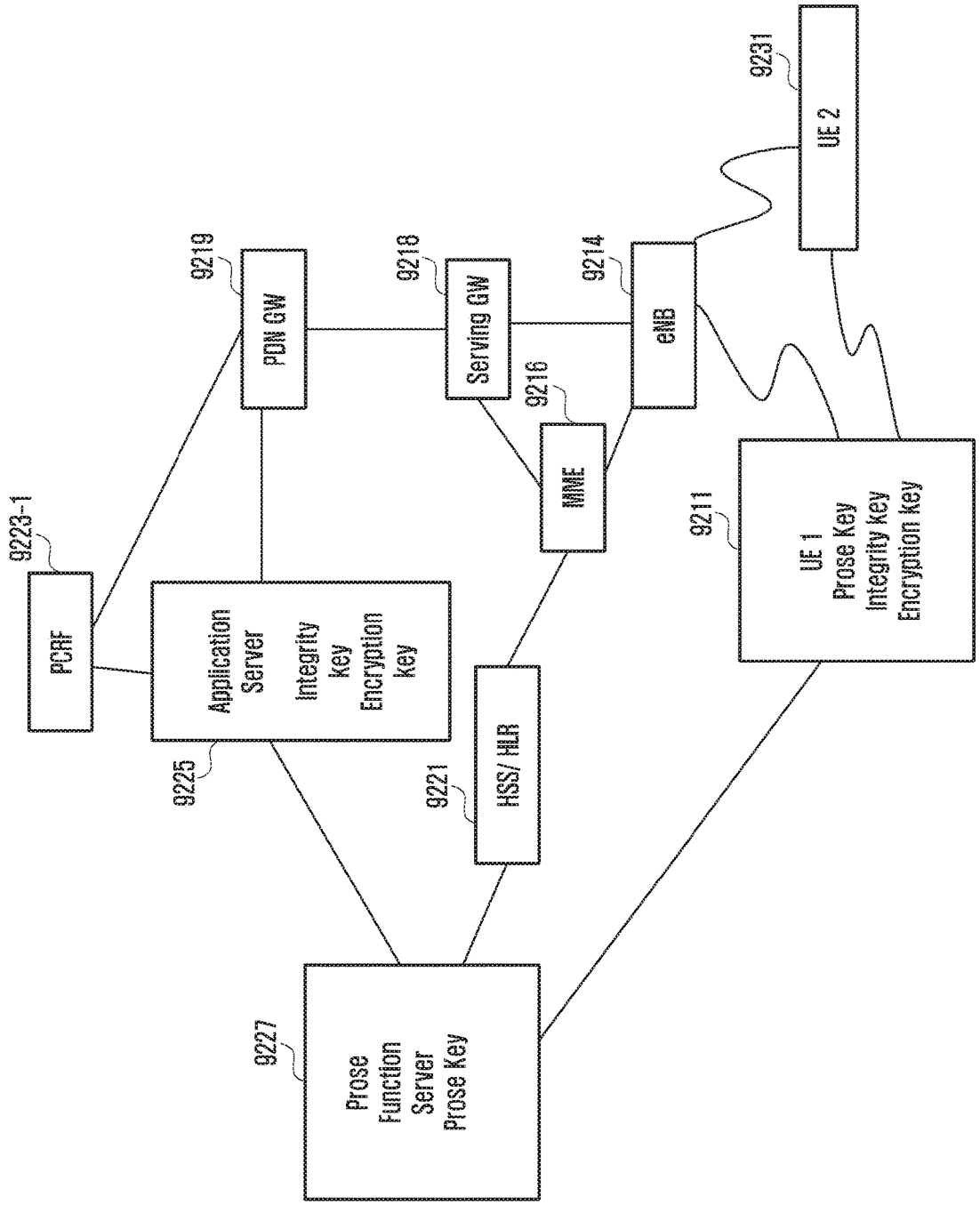
FIG. 10 is a flowchart illustrating a key generation method for security communication according to another embodiment of the present invention.

FIG. 10 is a flowchart illustrating a key generation method for security communication according to another embodiment of the present invention. Specifically, FIG. 10 illustrates key generation and relationship for prose discovery and prose communication security according to an embodiment of the present invention.

A prose function server 9227 may generate and transfer a prose key to a prose application server 9225. Further, an HSS 9221 may generate or inquire the prose key.

In an embodiment (case 1), the application server 9225 may generate a key for protecting a session using the prose key that is received from the prose function server, an encryption key for data encryption, or an integrity key for data integrity. Further, in another embodiment (case 2), the application server may generate the encryption key for the data encryption, or may generate and transfer the integrity key for the data integrity to the UE.

The UE 9211 generates the prose key. Further, in still another embodiment (case 3), the UE may generate any one of the session key, the integrity key, and the encryption key. On the other hand, according to still another embodiment (case 4), the UE may decrypt and use any one of the session key, the integrity key, and the encryption key.

FIG. 11 is a flowchart illustrating a key management method for security communication according to another embodiment of the present invention. FIG. 11 relates to an embodiment (case 1 and case 3) of key management schemes for prose discovery and prose communication security according to an embodiment of the present invention.

IK and CK 1503 are an integrity key and a cipher key that are generated from the UE and the HSS. The prose key 1507 may be generated from the IK and the CK.

$$\text{Prose key} = \text{KDF}(\text{IK,CK,application server ID,RAND, prose server ID}) \quad \text{[Equation 1]}$$

Equation 1 may be applied in the case where the prose key participates in the registration of an application.

$$\text{Prose key} = \text{KDF}(\text{IK,CK,RAND,prose server ID}) \quad \text{[Equation 2]}$$

Equation 2 may be applied in the case where the prose key participates in the registration of a prose function. In equation 2, the term "prose server ID" may mean a prose function ID.

In equation 1 and equation 2, IK denotes an integrity key, CK denotes a cipher key, application server ID denotes an identity of an application server, RAND denotes a random number, and prose server ID denotes an identity of a prose server.

In equation 1 and equation 2, CK||IK that is the concatenation of IK and CK may be used as the key. Further, the application server ID, the RAND, and the prose server ID may be concatenated to be used. The term "KDF" denotes a key derivation function, and may be, for example, HMAC-SHA 256.

As in an embodiment (case 1), the session key, the encryption key, and the integrity key may be generated from the prose key.

For example, the session key may be generated as in the following equation 3.

$$\text{Session key} = \text{KDF}(\text{CK,IK,session key algorithm ID}) \quad \text{[Equation 3]}$$

Here, IK denotes an integrity key, CK denotes a cipher key, and session key algorithm ID denotes an identity that is used to identify a session key algorithm.

In this case, CK||IK that is the concatenation of IK and CK may be used as the key.

$$\text{Encryption key} = \text{KDF}(\text{CK,IK,encryption key algorithm ID}) \quad \text{[Equation 4]}$$

Here, IK denotes an integrity key, CK denotes a cipher key, and encryption key algorithm ID denotes an identity that is used to identify an encryption key algorithm.

In this case, CK||IK that is the concatenation of IK and CK may be used as the key.

$$\text{Integrity key} = \text{KDF}(\text{CK,IK,integrity key algorithm ID}) \quad \text{[Equation 5]}$$

Here, IK denotes an integrity key, CK denotes a cipher key, and integrity key algorithm ID denotes an identity that is used to identify an integrity key algorithm.

In this case, CK||IK that is the concatenation of IK and CK may be used as the key.

Further, according to another embodiment (case 2), the application server may protect and transfer the session key, the encryption key, or the integrity key, which is separately generated, to the UE. The session key, the encryption key, and the integrity key may be generated in various methods, and in order to protect and transfer the session key, the encryption key, and the integrity key to the UE, the generated prose key may be used. That is, according to an embodiment (case 2-1), the prose key may protect and transfer the session key, whereas according to another embodiment (case 2-2), the prose key may be used to protect and transfer the encryption key and the integrity key. That is, according to an embodiment (case 2-1), the prose key may protect and transfer the session key, and the UE may decrypt and use the encryption key and the integrity key again using the transferred session key. Further, according to another embodiment (case 2-2), the prose key may protect and transfer the encryption key and the integrity key, and the UE may decrypt and use the encryption key and the integrity key.

Figure 12:
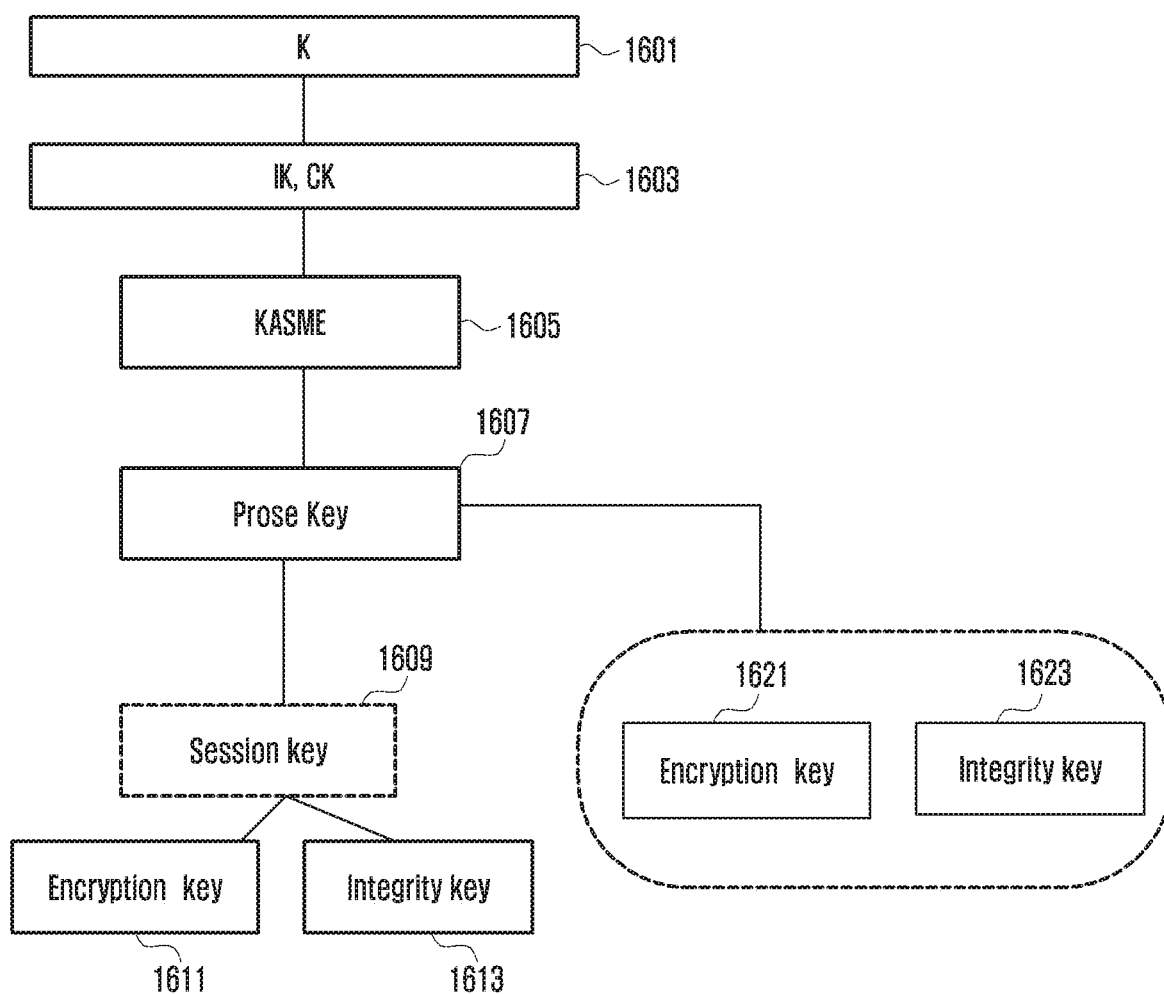

FIG. 12 is a flowchart illustrating a key management method for security communication according to another embodiment of the present invention. Specifically, FIG. 12 relates to an embodiment (case 2 and case 4) of key management schemes for prose discovery and prose communication security according to an embodiment of the present invention. The methods of FIGS. 11 and 12 are different from each other on the point that in the method of FIG. 11, the prose key is generated from the CK and the IK, whereas in the method of FIG. 12, the prose key is generated from a Key Access Security Management Entity ($K_{ASME}$). In this case, the prose function server may be implemented by various methods. For example, the prose function server may be combined with the MME to form a combined structure, or the prose function server may receive the $K_{ASME}$ from the MME.

IK and CK 1603 are an integrity key and a cipher key that are generated from the UE and the HSS. The $K_{ASME}$ 1605 may be generated from the IK and the CK. The prose key 1607 may be generated from the $K_{ASME}$.

The prose key may be generated as in the following equation.

$$\text{Prose key} = \text{KDF}(K_{ASME},\text{application server ID,RAND, prose server ID}) \quad \text{[Equation 6]}$$

Equation 6 may be applied in the case where the prose key participates in the registration of an application.

$$\text{Prose key} = \text{KDF}(K_{ASME},\text{RAND,prose server ID}) \quad \text{[Equation 7]}$$

Equation 7 may be applied in the case where the prose key participates in the registration of a prose function. In equation 7, the term "prose server ID" may mean a prose function ID.

In equation 6 and equation 7, $K_{ASME}$ may be generated from the IK, CK, a serving network identity, and a sequence number. An application server ID denotes an identity of an application server, RAND denotes a random number, a prose server ID denotes an identity of a prose server, and KDF denotes a key derivation function, and may be, for example, HMAC-SHA 256.

The application server ID, the RAND, and the prose server ID may be concatenated to be used.

As in an embodiment (case 2), the session key, the encryption key, and the integrity key may be generated from the prose key.

For example, the session key may be generated as follows.

Session key=KDF(CK,IK,session key algorithm ID) [Equation 8]

Here, IK denotes an integrity key, CK denotes a cipher key, and session key algorithm ID denotes an identity that is used to identify a session key algorithm.

Further, CK||IK that is the concatenation of IK and CK may be used as the key.

Encryption key=KDF(CK,IK,encryption key algorithm ID) [Equation 9]

Here, IK denotes an integrity key, CK denotes a cipher key, and encryption key algorithm ID denotes an identity that is used to identify an encryption key algorithm.

Further, CK||IK that is the concatenation of IK and CK may be used as the key.

Integrity key=KDF(CK,IK,integrity key algorithm ID) [Equation 10]

Here, IK denotes an integrity key, CK denotes a cipher key, and integrity key algorithm ID denotes an identity that is used to identify an integrity key algorithm.

In this case, CK||IK that is the concatenation of IK and CK may be used as the key.

Further, according to another embodiment (case 4), the application server may protect and transfer the session key, the encryption key, or the integrity key, which is separately generated, to the UE. The session key, the encryption key, and the integrity key may be generated in various methods, and in order to protect and transfer the session key, the encryption key, and the integrity key to the UE, the generated prose key may be used. That is, according to an embodiment (case 4-1), the prose key may protect and transfer the session key, whereas according to another embodiment (case 4-2), the prose key may be used to protect and transfer the encryption key and the integrity key. That is, according to an embodiment (case 4-1), the prose key may protect and transfer the session key, and the UE may decrypt and use the encryption key and the integrity key again using the transferred session key. Further, according to another embodiment (case 4-2), the prose key may protect and transfer the encryption key and the integrity key, and the UE may decrypt and use the encryption key and the integrity key.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

The invention claimed is:

1. A security communication method for user equipment (UE) for proximity based services (prose), the security communication method comprising:
   transmitting, to a prose function, a first message including a public key of the UE and a prose function identification (ID);
   receiving, from the prose function, a prose authentication token in response to the first message;
   transmitting, to the prose function, a second message including a value determined based on the prose authentication token;
   receiving, from the prose function, a third message including a prose group key (PGK), a PGK ID, and a prose public land mobile network (PLMN) list;
   generating a prose traffic key (PTK) based on the PGK and a PTK ID;
   deriving a prose encryption key (PEK) based on the PTK;
   receiving, from the prose function, a public key of another UE communicating with the UE; and
   performing a device-to-device (D2D) communication by encrypting data based on the PEK and using the public key of the other UE.

2. The security communication method of claim 1, wherein the third message includes at least one of a prose ID, a prose capability, and a security key.

3. The security communication method of claim 1, further comprising:
   receiving, from a mobility management entity (MME), a fourth message including a UE authentication token (AUTN); and
   transmitting, to the MME, a fifth message including a response security value (RES) in response to the fourth message.

4. The security communication method of claim 1, further comprising:
   receiving, from an MME, a non access stratum security command (NAS SMC); and
   transmitting, to the MME, a non access stratum security completion response.

5. The security communication method of claim 2, further comprising:
   receiving, from an evolved Node B (eNB), an access stratum security command (AS SMC); and
   transmitting, to the eNB, an access stratum security completion response.

6. A user equipment (UE) configured to perform security communication in a network that provides proximity based services (prose), the UE comprising:
   a transceiver; and
   a controller coupled with the transceiver and configured to:
      control the transceiver to transmit a first message including a public key of the UE and a prose function identification (ID),
      control the transceiver to receive, from the prose function, a prose authentication token in response to the first message,
      control the transceiver to transmit, to the prose function, a second message including a value determined based on the prose authentication token, control the transceiver to receive a third message including a prose group key (PGK), a PGK identification (ID), and a prose public land mobile network (PLMN) list, generate a prose traffic key (PTK) based on the PGK and a PTK ID, derive a prose encryption key (PEK) based on the PTK, control the transceiver to receive a public key of another UE communicating with the UE from the prose function, and perform a device-to-device (D2D) communication by encrypting data based on the PEK and using the public key of the other UE.

7. The UE of claim 6, wherein the third message includes at least one of a prose ID, a prose capability, and a security key.

8. The UE of claim 6, wherein the controller is further configured to:

control the transceiver to receive, from a mobility management entity (MME), a fourth message including a UE authentication token (AUTN), and control the transceiver to transmit, to the MME, a fifth message including a response security value (RES) in response to the fourth message.

9. The UE of claim 6, wherein the controller is further configured to:

control the transceiver to receive, from an MME, a non access stratum security command (NAS SMC), and control the transceiver to transmit, to the MME, a non access stratum security completion response.

10. The UE of claim 6, wherein the controller is further configured to:

control the transceiver to receive, from an evolved Node B (eNB), an access stratum security command (AS SMC), and control the transceiver to transmit, to the eNB, an access stratum security completion response.

* * * * *